No. 730,145. PATENTED JUNE 2, 1903.
J. A. McNAMEE.
SAFETY TREAD FOR STAIRS.
APPLICATION FILED SEPT. 6, 1902.
NO MODEL.

Witnesses:
Walter E. Lombard

Inventor:
James A. McNamee,
by
Atty.

No. 730,145. Patented June 2, 1903.

UNITED STATES PATENT OFFICE.

JAMES A. McNAMEE, OF CAMBRIDGEPORT, MASSACHUSETTS.

SAFETY-TREAD FOR STAIRS.

SPECIFICATION forming part of Letters Patent No. 730,145, dated June 2, 1903.

Application filed September 6, 1902. Serial No. 122,299. (No model.)

*To all whom it may concern:*

Be it known that I, JAMES A. MCNAMEE, a citizen of the United States, and a resident of Cambridgeport, in the county of Middlesex and State of Massachusetts, have invented certain new and useful Improvements in Safety-Treads for Stairs, of which the following is a specification.

This invention relates to an improved safety-tread for stairs made of concrete or plastic material; and it consists in embedding in the mass, while in a plastic state, a series of bars of lead preferably arranged in parallel rows and having one of their sides or edges projecting through and even with the face of the stair-tread. The said lead bars are firmly held in position in the mass of which the tread is composed after such plastic mass has been allowed to set and harden. By this means I produce a composite tread-surface composed in part of concrete and in part of lead firmly embedded in the mass, the advantage of which is that it serves to prevent slipping on account of the exposed lead surfaces arranged intermediate the concrete mass, as will hereinafter be more fully shown and described, reference being had to the accompanying drawings, where—

Figure 1:
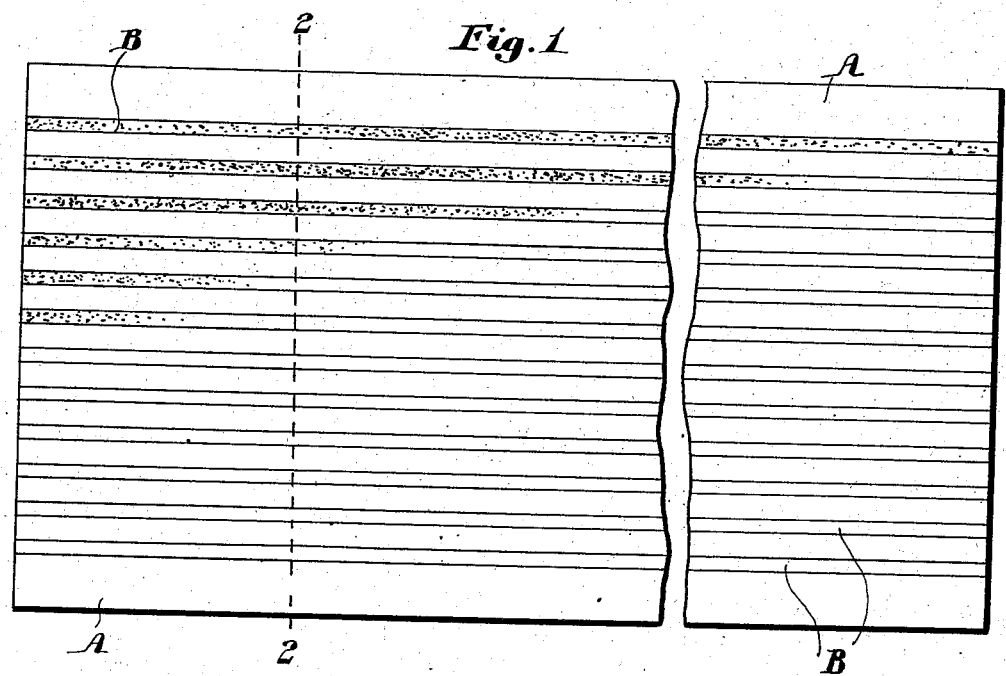
Figure 2:
Figure 3:
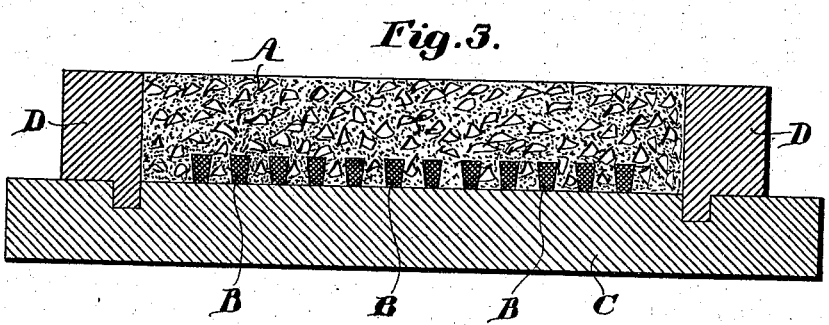

Figure 1 is a top plan view of my improved safety stair-tread. Fig. 2 is a cross-section on the line 2 2 shown in Fig. 1, and Fig. 3 is a sectional view of the mold in which the composite tread is shown as being made.

Similar letters refer to similar parts wherever they occur on the different parts of the drawings.

The improved stair-tread is made of concrete or other suitable plastic material A, into the face of which are embedded a series of preferably parallel lead bars B B while the mass is plastic. The said lead bars are preferably dovetailed in section, as shown, so as to cause them to remain firmly held in position in the mass after it is set and hardened.

In making the stair-tread I prefer to make use of a mold composed of a bottom board C and inclosing walls D, preferably detachably attached to said bottom board.

In molding the tread I first place the lead bars B B upon the bottom board C at suitable distances apart, as may be desired, after which I fill the mold with suitable plastic concrete or plastic material, causing the lead bars B B to be embedded in the (for the time being) under side of the molded tread. The plastic mass is then allowed to set and harden, causing the said lead bars to be firmly secured in the face portion of the tread. In this manner I produce an antislip frictional tread-surface of great durability and one which will wear evenly, so as to retain its composite frictional property for a great length of time.

What I wish to secure by Letters Patent and claim is—

A composite stair-tread consisting of a rectangular body of plastic material, and a series of leaden bars substantially wedge-shaped in cross-section and extending in said body, so their side and bottom faces will be engaged by the said material and their outer faces flush with the upper face of said body, said bars when embedded in said material, extending parallel to one another throughout their entire length, and said body of plastic material and said bars when set up forming a stair-tread with its sides and bottom surfaces constructed of plastic material and its top surface constructed of plastic material and the leaden bars, substantially as herein shown and described.

In testimony whereof I have affixed my signature in presence of two witnesses.

JAMES A. McNAMEE.

Witnesses:
ALBAN ANDRÉN,
DAVID H. CULLEN.